(12) United States Patent
Hallock et al.

(10) Patent No.: US 11,426,864 B2
(45) Date of Patent: Aug. 30, 2022

(54) ROBOT MANIPULATOR SYSTEM AND METHODS FOR PROVIDING SUPPLEMENTAL SECUREMENT OF OBJECTS

(71) Applicant: Kindred Systems Inc., San Francisco, CA (US)

(72) Inventors: David Gabriel Hallock, San Francisco, CA (US); Jun Jeong, San Francisco, CA (US)

(73) Assignee: Kindred Systems Inc., San Francisco, CA (US)

(*) Notice: Subject to any disclaimer, the term of this patent is extended or adjusted under 35 U.S.C. 154(b) by 265 days.

(21) Appl. No.: 16/702,195

(22) Filed: Dec. 3, 2019

(65) Prior Publication Data

US 2020/0171650 A1 Jun. 4, 2020

Related U.S. Application Data

(60) Provisional application No. 62/774,713, filed on Dec. 3, 2018.

(51) Int. Cl.
| | |
|---|---|
| B25J 9/00 | (2006.01) |
| B25J 9/16 | (2006.01) |
| B25J 19/02 | (2006.01) |

(52) U.S. Cl.
CPC ............ *B25J 9/0087* (2013.01); *B25J 9/009* (2013.01); *B25J 9/1612* (2013.01); *B25J 9/1615* (2013.01); *B25J 9/1661* (2013.01); *B25J 19/02* (2013.01)

(58) Field of Classification Search
CPC ................. B25J 9/00; B25J 9/16; B25J 19/02
See application file for complete search history.

(56) References Cited

U.S. PATENT DOCUMENTS

| | | | | |
|---|---|---|---|---|
| 9,227,323 | B1* | 1/2016 | Konolige | .................. H04N 5/33 |
| 9,242,799 | B1* | 1/2016 | O'Brien | .................. G06Q 10/08 |
| 9,327,397 | B1* | 5/2016 | Williams | .................... B25J 3/04 |
| 10,192,195 | B1* | 1/2019 | Brazeau | ............... G06Q 10/087 |
| 2006/0184272 | A1* | 8/2006 | Okazaki | ................. B25J 9/1697 |
| | | | | 700/245 |
| 2011/0290090 | A1* | 12/2011 | Urabe | .................... B23P 19/001 |
| | | | | 901/14 |
| 2017/0120402 | A1* | 5/2017 | Inutake | .................. B25J 19/023 |
| 2017/0136632 | A1* | 5/2017 | Wagner | .................... B25J 19/04 |
| 2017/0183157 | A9* | 6/2017 | Massey | ................ B65G 1/1373 |
| 2019/0227532 | A1* | 7/2019 | Keselman | .............. B25J 11/005 |

* cited by examiner

*Primary Examiner* — Kira Nguyen
(74) *Attorney, Agent, or Firm* — Seed IP Law Group LLP

(57) ABSTRACT

A robotic manipulator system includes a first robotic manipulator and a second robotic manipulator configured to grasp an object. The first robotic manipulator grasps the object a first time and moves the object to the second robotic manipulator. The second robotic manipulator then grasps the object and the first robotic manipulator readjusts its position relative to the object before grasping the object a second time. One or both of the robotic manipulators then move the object a new location before releasing the object at the new location.

18 Claims, 11 Drawing Sheets

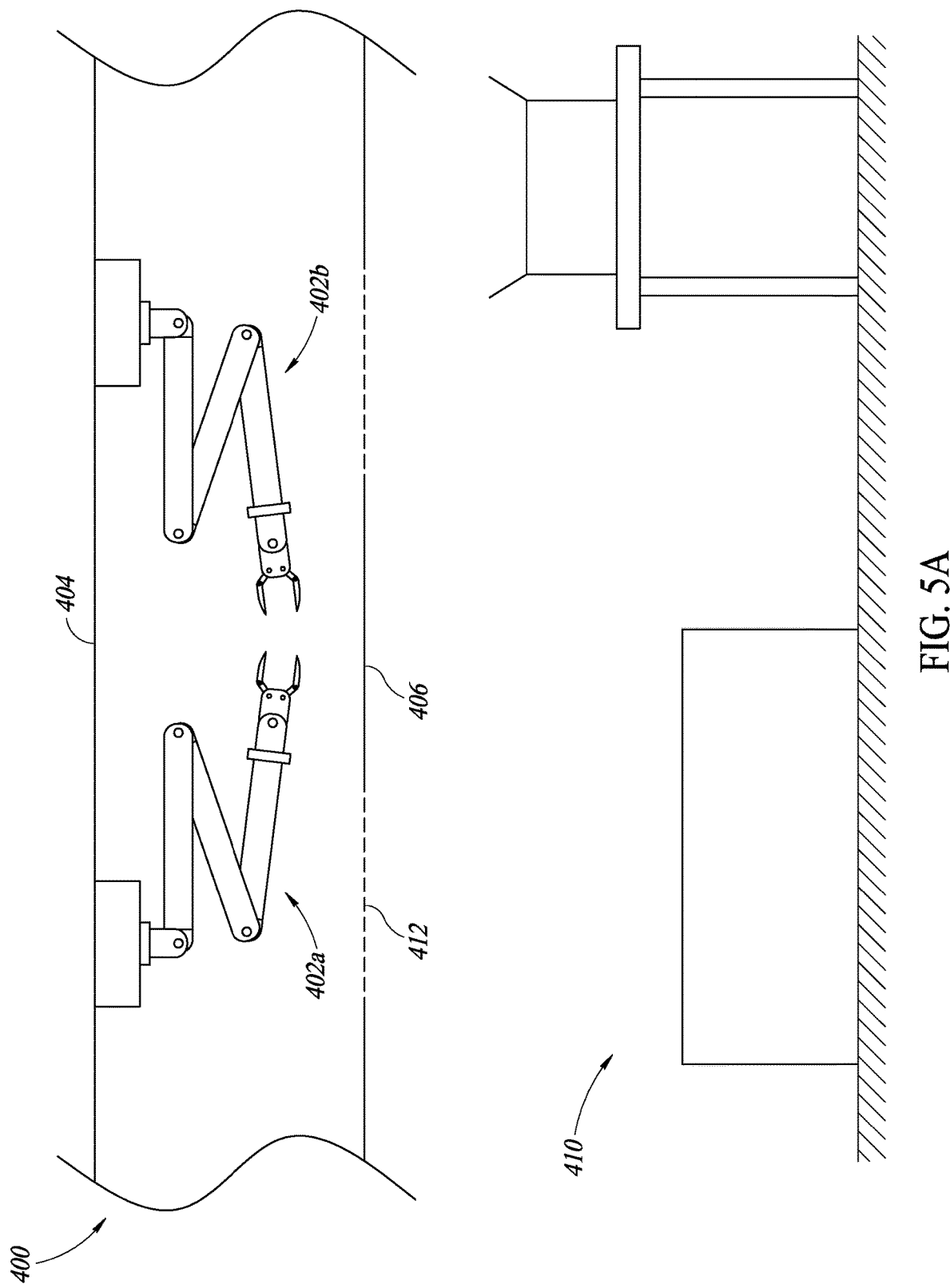

ROBOT MANIPULATOR SYSTEM AND METHODS FOR PROVIDING SUPPLEMENTAL SECUREMENT OF OBJECTS

TECHNICAL FIELD

The present disclosure is generally directed to robots, and more particularly, to the operation of one or more robots and the manipulation of objects by one or more robots.

BACKGROUND

Description of the Related Art

Certain types of robots are known. Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot typically has the ability to move in a physical space and to accomplish physical tasks. Robots may be operated by a human operator, such as, via remote control, or may operate autonomously without control of an operator. Hybrid robots exist in which some functions are autonomous while others are operator controlled, or control switches between autonomous and operator controlled modes. Some robots include computational resources to preform computational tasks. The computational tasks can be in aid of the physical tasks. Some known robots include an end effector grasping tool.

An end effector or end of arm tool is a device attached to a robotic arm, manipulator, or appendage designed or structured to interact with an environment. Examples of end effectors include grippers or graspers. End effectors can perform many tasks, including for example grasp or grip or otherwise physically releasably engage or interact with an item or object. A grasp includes static and dynamic end effector posture or poses by which an item can be securely held, or otherwise releasably engaged, by one or more end effectors.

BRIEF SUMMARY

One or more embodiments of a method include: grasping an object at a first location with a first end effector of a first robotic manipulator; grasping the object with a second end effector of a second robotic manipulator; releasing the object from the first end effector of the first robotic manipulator; manipulating the object to an orientation where a machine-readable symbol (e.g., barcode, QR code, text) of the object is within a line of sight of a scanner; scanning the machine-readable symbol of the object; and releasing the object from the second end effector of the second robotic manipulator.

The method may further include: controlling a robot including the first robotic manipulator and the second robotic manipulator with a control system; before grasping the object from the first location, deploying the first robotic manipulator and the second robotic manipulator from a storage position wherein the first and second robotic manipulators are recessed with respect to a ceiling to a deployed configuration wherein the first and second robotic manipulators extend from the ceiling; manipulating the object including manipulating the object with the second end effector of the second robotic manipulator; and manipulating the object including manipulating the object with the first end effector of the first robotic manipulator by grasping the object with the first end effector of the first robotic manipulator a second time after releasing the object from the first end effector of the first robotic manipulator, and releasing the object from the second end effector of the second robotic manipulator.

The method may further include: grasping the object at the first location with the first end effector of the first robotic manipulator including the first robotic manipulator having a first number of degrees of freedom and wherein grasping the object with the second end effector of the second robotic manipulator includes the second robotic manipulator having a second number of degrees of freedom less than the first number of degrees of freedom; and releasing the object from the second end effector of the second robotic manipulator including releasing the object at a second location different from the first location.

One or more embodiments of a method include: grasping an object at a first location with a first tool of a first robot; grasping the object with a second tool of a second robot; moving the object to a second location corresponding to a scanner by moving the first robot and the second robot; scanning a machine-readable symbol of the object; moving the object to a third location; and releasing the object from the first tool of the first robot and the second tool of the second robot at the third location.

The method may further include: moving the object with the first tool and the second tool including manipulating the object to an orientation wherein the machine-readable symbol of the object is within a line of sight of the scanner; grasping the object with the second tool of the second robot including grasping the object with the second tool of the second robot at the first location; moving the object to the third location including the third location being the same as the first location; releasing the object from the first tool and the second tool including releasing the object into a shipping container; before releasing the object from the first tool and the second tool, manipulating the object to align the object with an opening of the shipping container; and moving the object with the first tool and the second tool including manipulating the object to an orientation where the machine-readable symbol of the object is in a line of sight of the scanner.

One or more embodiments of a method include: grasping a first object with a first end effector of a first arm of a robotic manipulator; moving the first object proximate a second arm of the robotic manipulator; grasping the first object with a second end effector of the second arm of the robotic manipulator; releasing the first object from the first end effector of the first arm of the robotic manipulator; moving the first end effector of the first arm to a different position relative to the first object; grasping the first object with the first end effector of the first arm a second time; and releasing the first object from the second end effector of the second arm of the robotic manipulator.

The method may further include: grasping the first object with the second end effector of the second arm of the robotic manipulator including the second arm of the robotic manipulator being stationary; after releasing the first object from the second end effector of the second arm of the robotic manipulator, grasping a second object with a different size and shape than the first object with the first end effector of the first arm of the robotic manipulator, and moving the second object proximate the second arm of the robotic manipulator; and grasping the second object with the second arm of the robotic manipulator, moving the second object with the first arm of the robotic manipulator until a machine-readable symbol of the second object is in a line of sight of the scanner, and scanning the machine-readable symbol of the second object.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. In some figures, the structures are drawn to scale. In other figures, the sizes and relative positions of elements in the drawings are not necessarily drawn to scale. For example, the sizes, shapes of various elements and angles may be enlarged and positioned in the figures to improve drawing legibility.

FIG. 5A is a side view an embodiment of a robotic manipulator illustrating the robotic manipulator in a storage configuration recessed with respect to a ceiling according to the present disclosure.

DETAILED DESCRIPTION

Figure 1:
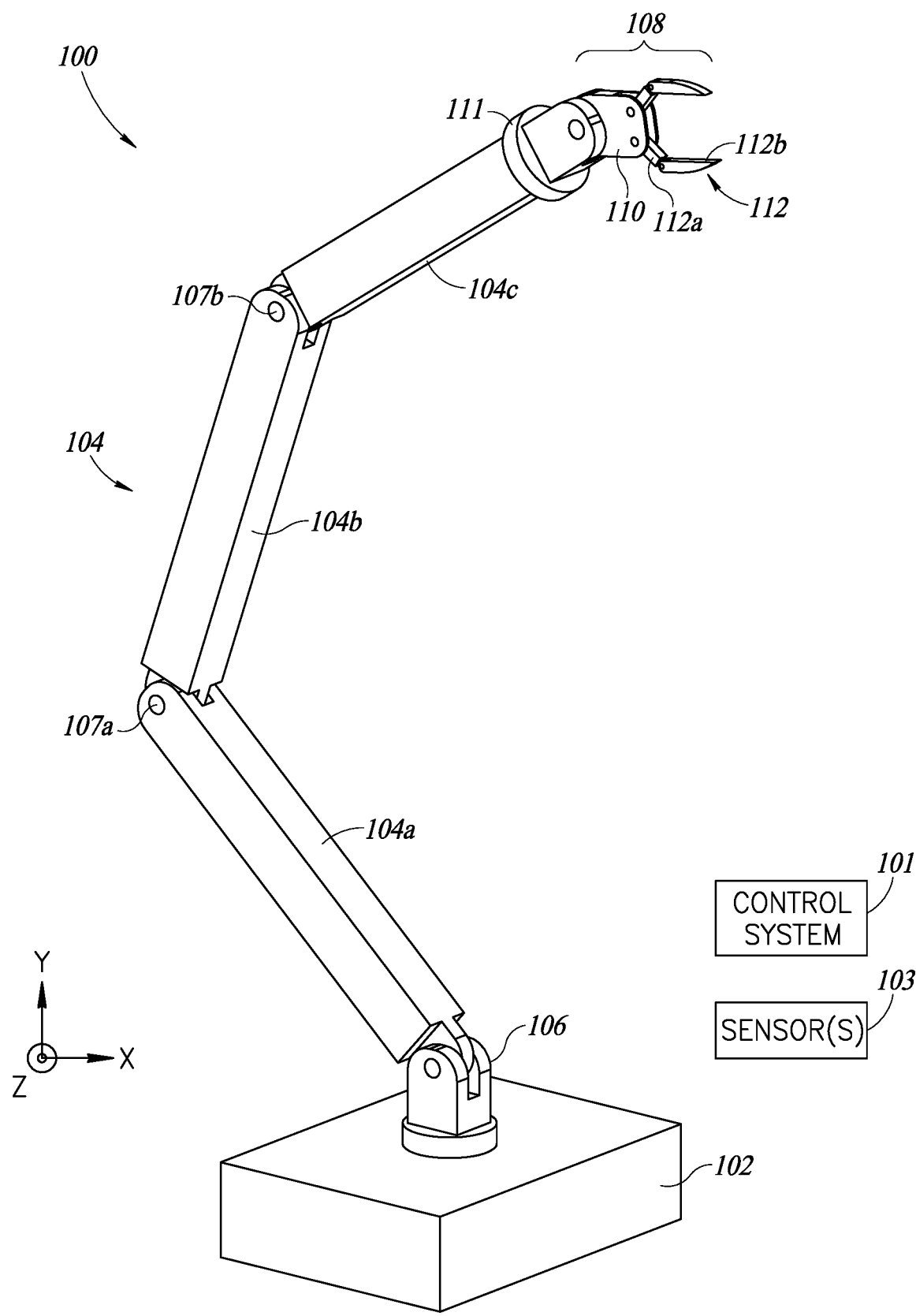
FIG. 1 is a perspective view of an embodiment of a robotic manipulator having an end effector according to the present disclosure.

The present disclosure is directed to providing a secondary robot manipulator that is configured to provide supplemental securement to objects being handled by a primary robot manipulator, where the robot manipulators are used to assist in pick and place, gripping, identification, and sorting functions, among others.

In some embodiments, the supplemental securement utilizes a secondary robot manipulator that can temporarily, permanently, or semi-permanently grasp or hold an object while a primary robot manipulator handles, or moves-to, an object, or while the primary robot manipulator re-positions its location or orientation, or both, in order to optimize object grasping.

The robot manipulators have an end-of-arm-tooling ("EOAT") with fingers or grippers that can be powered electrically, hydraulically, mechanically, pneumatically, etc. The end-or-arm-tooling may also be referring to herein as an end effector or simply a tool. In other embodiments, the robot manipulators can be vacuum grippers, or can include an EOAT that includes a vacuum suction mechanism.

The primary and secondary robot manipulators are both EOATs in some embodiments. In other embodiments, the primary robot manipulator can be a first type (such as, for example, an EOAT), while the second robot manipulator can be a second type (such as, for example, a vacuum gripper).

In one or more embodiments, the secondary robot manipulator can grasp a target object and hold the object in an optimal position that allows the primary robot manipulator to grasp the object. Once the primary robot manipulator has grasped the object, the secondary robot manipulator can release its grasp.

In other embodiments, the secondary robot manipulator can maintain its grasp after the primary robot manipulator has grasped the object, and can assist the primary robot manipulator in positioning, moving, storing, or like actions, the object, as further described herein.

In an embodiment, the secondary robot manipulator can be recessed, retracted, or hidden, for example, behind a ceiling, wall, or other structure. If the system determines that the target object requires a supplemental securement, the secondary robot manipulator is then activated, actuated, or deployed.

The system can be used in conjunction with reinforcement learning techniques, so that over time, the system can intelligently predict when a particular type, size, or shape of object may require a supplemental securement. The system can proactively deploy or position the secondary robot manipulator immediately upon determining if a target object would likely require a supplemental securement, based on learned data. This could reduce the amount of time for the system to determine if the secondary robot manipulator should be deployed, as well as reduce the time to execute the supplemental securement function.

In some embodiments, the secondary robot manipulator is located at a fixed position within an environment, such as a sorting station. In other embodiments, the secondary robot manipulator is mounted on an arm, such as a cantilevered or inverse-cantilevered arm, or mounted on a track or rail system, that allows the secondary robot manipulator to be positioned to various locations in the environment.

In yet other embodiments, the secondary robot manipulator can be controlled via signals from the primary robot manipulator. For example, sensors in the primary robot manipulator, such as strain gauges, pressure transducers, cameras, and the like can determine if the target object is too heavy to be grasped or positioned by the primary robot manipulator. In this scenario, the primary robot manipulator can signal the actuation of the secondary robot manipulator. Thus, the primary and secondary robot manipulators can have a master and slave or parent and child relationship. The signaling can be done through a wireless network, such as Wi-Fi®, infrared, radio frequency, radio frequency identification, Bluetooth® or ZigBee®. In other embodiments, the signaling can be done with a hard-wired connection between the two robot manipulators.

In further embodiments, the secondary robot manipulator can be controlled by a human operator. For example, the operator may observe that the primary robot manipulator requires assistance to grasp an object and remotely control the secondary robot manipulator to deploy or actuate.

In yet other embodiments, the system can switch the roles of each robot manipulator, such that a secondary robot manipulator can operate interchangeably as a primary or secondary robot manipulator. For example, if a target object is outside of a threshold distance from a primary robot manipulator, and within a threshold distance of a secondary robot manipulator, the secondary robot manipulator can be designated as the "primary" robot manipulator for the pick-and-place or handling operation. This can reduce the time for the handling operation as the secondary robot manipulator would take less time to reach the object to be grasped.

While the present embodiments are directed towards a robot manipulator in the form of an EOAT, vacuum gripper, or the like that has grasping or gripping functions, the present disclosure is not limited to these embodiments, and can be applied to various types of tooling and devices where one robot tool is used to secure an object, and a second robot tool provides additional securement, or provides a working function such as drilling, screwing, and other like actions on the object.

The robot manipulator can be utilized within a storage space or an assembly line. The storage space, as used herein, can be a bin, box, sorting station, room, or volume that is used to store, hold, warehouse, or otherwise contain objects.

In some embodiments, the robotic manipulators are implemented within a retail supply chain warehouse, where the objects include apparel, consumer goods, merchandise, and the like. However, the present disclosure is not intended to be limited to a retail supply chain setting, and the objects can include tools, parts, components, packages, letters, foodstuffs, and the like.

For example, FIG. 1 illustrates an embodiment of a robotic manipulator 100 according to the present disclosure. The robotic manipulator 100 includes a base 102 with an arm 104 coupled to the base 102. In one or more embodiments, the arm 104 is structured to rotate about the base 102. In other words, the arm 104 is rotatably coupled to the base 102 by a bracket 106 that allows for rotation, such as a bracket coupled to a rotating drive of an actuator, or other like structures such as a ball joint. The arm 104 includes three links 104a, 104b, 104c. A first link 104a is coupled to the base 102 by the bracket 106, a second link 104b is coupled to the first link 104a by a first joint 107a, and a third link 104c is coupled to the second link 104b by a second joint 107b. The first and second joints 107a, 107b are structured to enable rotational motion of the second link 104b relative to the first link 104a and the third link 104c relative to the second link 104b. In some embodiments, the joints 106a, 106b are structured to enable rotation about a z-axis (e.g., an axis in and out of the page), such that the second and third links 104b, 104c can rotate through a plane defined by a horizontal x-axis and a vertical y-axis while the connection between the arm 104 and the base 102 is structured to enable rotation about y-axis. As such, the robotic manipulator 100 can grasp an object located anywhere in the environment (defined by any location in the x-y-z coordinate system) surrounding the robotic manipulator 100.

Although the robotic manipulator 100 includes three links 104a, 104b, 104c in FIG. 1, it is to be appreciated that the robotic manipulator 100 can include more or less than three links 104a, 104b, 104c in other embodiments. For example, the robotic manipulator 100 may include only a single link, such as when the robotic manipulator 100 is a stationary robotic manipulator, or the robotic manipulator 100 may include four, five, six, seven, or more links. Moreover, the range or reach of the robotic manipulator 100 can be selected according to a length of each of the links 104a, 104b, 104c.

The robotic manipulator 100 further includes an end effector 108 (which may also be referred to herein as an EOAT 108 or a tool 108). The end effector 108 includes a connecting element 110 coupled to the third link 104c and structured to rotate relative to the third link 104c. For example, the connecting element 110 is coupled to a base plate 111, which is connected to a rotating drive shaft, actuator, or other member, as described herein, such that the base plate 111 rotates freely relative to the third link 104c. The connecting element 110 is structured to translate relative to the third link 104c, such as up and down or front to back in the orientation shown in FIG. 1. The end effector 108 further includes fingers 112 coupled to the connecting element 110. The fingers 112 are configured to grasp an object. In other embodiments, the fingers 112 are omitted and replaced by a vacuum gripper, such as an opening through the connecting element 110 wherein air is drawn in through the opening to enable gripping by suction. In some embodiments, the end effector 108 includes both the fingers 112 and the vacuum suction element. The fingers 112 are structured to rotate relative to the connecting element 110, such that the fingers 112 can move proximate to each other to secure an object, or move to be spaced from one another to release an object.

The base 102, the arm 104, the connecting element 110 as well as the fingers 112 may be made of metal, plastic, or a composite material. In at least one embodiment, the end effector 108 includes an actuator coupled to the connecting element 110. The actuator can be a rotatory actuator, such as a servo or motor coupled to a windlass directly or via a gear train, shaft, belt, chain or the like. The actuator can also be a linear actuator in other embodiments. One or more tensile members may be coupled to and pulled by the actuator. As such, the actuator may draw in or pull, or release or let out a tensile member in order to move the fingers 112. Although FIG. 1 illustrates that the end effector 108 includes two fingers 112, the end effector 108 can include more or less than two fingers.

The robotic manipulator 100 (e.g., arm 104 and end-effector 108) may be directed to grasp, releasably engage, or otherwise handle various items that have different tangible properties. The robotic manipulator 100 may be associated with or communicatively coupled to one or more optional operator interfaces as well as a computer system 101 (also referred to herein as "control system" or "system"), which is an example of a processor-based device. In some implementations, the robotic manipulator is associated with a non-transitory computer- and processor-readable storage device. The robotic manipulator 100 is communicatively coupled to a network or non-network communication channel. Examples of a suitable network or non-network communication channel include a wire-based network or communication channel, optical based network or communication channel, wireless network or communication channel, or a combination of wired, optical, and/or wireless networks or communication channels.

In some embodiments, a human operator at the operator interface can selectively pilot the robotic manipulator 100. In human operator controlled (or piloted) mode, the human operator observes representations of sensor data, for example, video, audio, or haptic data received from one or more environmental sensors or internal sensors 103. The human operator then acts, conditioned by a perception of the representation of the data, and creates information or executable instructions to direct the robotic manipulator 100. The robotic manipulator 100 operates in, and receives data about, an environment that comprises a physical space. The term "about" is employed here in the sense of represent, characterize, or summarize. The data about the environment is received from one or more sensors. In some embodiments, the one or more sensors are on the robotic manipulator 100. In some embodiments, the one or more sensors are external to the robotic manipulator 100, such as, a camera, microphone, or a machine-readable symbol scanner (e.g., barcode scanner).

In some embodiments, the robotic manipulator 100 is structured to operate autonomously without an operator interface or human operator. The robotic manipulator 100 may operate in an autonomous control mode by executing autonomous control instructions. For example, the computer system or the robotic manipulator 100 can use sensor data from one or more sensors associated with operator generated robot control instructions and the operator generated robot control instructions from one or more times the robotic manipulator 100 was in piloted mode to generate autonomous robot control instructions for subsequent use. For example, deep learning techniques can be used to extract features from the sensor data such that in autonomous mode, the robotic manipulator autonomously recognizes features and/or conditions in its environment and in response performs a defined act, set of acts, a task, or a pipeline of tasks. Example acts or tasks include recognizing the presence of an object to be grasping depending on the features extracted from the sensor data, and grasping the object. In the absence of an object, the robot executing the autonomous robot control instructions would not grasp the air as if an object was present.

In some embodiments, the control or computer system 101 is a smaller processor-based device such as a mobile phone, single board computer, embedded computer, and the like. The computer system may, in some instances, be termed or referred to interchangeably as a computer, server, or an analyzer. The computer system may create autonomous control instructions for the robotic manipulator 100 and other similar robotic manipulators or robots in a coordinated environment. In some embodiments, the robotic manipulator 100 may be controlled autonomously at one time, while being piloted, operated, or controlled by a human operator at another time. That is, operate under an autonomous control mode and change to operate under a piloted mode (i.e., non-autonomous). In a third mode of operation, the robotic manipulator 100 can replay or execute piloted robot control instructions in a human operator controlled (or piloted) mode. That is operate without sensor data and replay pilot data, so called, replay mode.

Robotic manipulator 100 is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. The robotic manipulator performs physical acts, actions, or tasks, as described herein. For example, the task may include producing tangible results or computational tasks, or both. In some instances, the robotic manipulator 100 has the ability to move in a physical space, such as an environment, to accomplish physical tasks. The robotic manipulator 100 may also include computational resources, on-board and/or remote computational resources, to perform computational tasks. The computational tasks can be in aid of the physical tasks, e.g., planning, as a task, for accomplishing a tangible result to a physical task. The robotic manipulator 100 has the ability to acquire information from sensors, on-board and/or remote sensors. The robotic manipulator 100 can be operated independently or can be part of or included in a larger system containing multiple robotic manipulators 100.

In one or more embodiments, the robotic manipulator 100 includes a propulsion or motion subsystem comprising of one or more motors, solenoids or other actuators, and associated hardware (e.g., drivetrain, wheel(s), treads) to propel the robotic manipulator 100 in a physical space. An example of a motion subsystem is a set of drivetrain and wheels or a roller on a rail connected to a drivetrain or pulley system.

The robotic manipulator 100 includes a manipulation subsystem comprising one or more appendages, such as, the arm 104 and one or more associated end-effectors, such as end effector 108. An end effector is a device attached to a robotic arm designed to interact with the environment. In one or more embodiments, the robotic manipulator 100 includes a sensor subsystem comprising one or more sensors, such as, one or more imaging devices, cameras, or scanners, or one or more microphones. The sensor subsystem acquires data that characterizes or represents the robotic manipulator 100 in a context or scenario, and/or performing one or more tasks. The data includes environmental sensor information, or environment information, representative of environmental conditions external to the robotic manipulator 100.

The robotic manipulator 100 can also include, in one or more embodiments, a processor as well as a control subsystem. The control subsystem includes at least one processor, at least one non-transitory computer- and processor-readable storage device, and at least one bus to which, or by which, the at least one processor and storage device(s) are communicatively coupled.

The robotic manipulator 100 may also include a network interface subsystem, e.g., a network interface device, that is communicatively coupled to bus(es) and provides bi-directional communication with other systems (e.g., external systems external to the robotic manipulator 100) via a network or non-network communication channel. The network interface subsystem includes one or more buffers. The network interface subsystem receives and sends data related to partition of a plurality of items. The network interface subsystem may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI® compliant, BLUETOOTH® compliant, cellular (e.g., GSM, CDMA), and the like. Suitable transportation protocols include TCP/IP, SCTP, and DCCP.

The robotic manipulator 100 may also include an input subsystem comprising one or more sensors that detect, sense, or measure conditions or states of the robotic manipulator 100 and/or conditions in the environment in which the robot operates, and produce or provide corresponding sensor data or information. Such sensors include cameras or other imagers or scanners, touch sensors, load cells, pressure sensors, microphones, or the like. The input subsystem may create environment information that represents the environment to the robotic manipulator 100.

The robotic manipulator 100 includes an output subsystem comprising output devices, such as, speakers, lights, and displays. In some embodiments, the output subsystem includes a propulsion or motion subsystem and/or a manipulation subsystem. The robotic manipulator 100 may use the output subsystem to perform one or more actions. The one or more actions may performed in response to executing autonomous processor-executable robot control instructions, and operator generated processor-executable robot control instructions.

The input subsystem and output subsystem, are communicatively coupled to processor(s) via bus(es). In some embodiments, the input subsystem includes receivers to receive position and/or orientation information. For example, a global position system (GPS) receiver to receive GPS data, two or more time signals for the control subsystem to create a position measurement based on data in the signals, such as, time of flight, signal strength, or other data to effect a position measurement. Also for example, one or more accelerometers can provide inertial or directional data in one, two, or three axes.

The robotic manipulator 100 includes, in some embodiments, a propulsion or motion subsystem comprising motors, actuators, drivetrain, wheels, and the like to propel or move the robotic manipulator 100 within a physical space and interact with it. The propulsion or motion subsystem comprises one or more motors, solenoids or other actuators, and associated hardware (e.g., drivetrain, wheel(s), treads), to propel the robot in a physical space.

The robotic manipulator 100 includes a manipulation subsystem, for example comprising one or more arms, end-effectors, associated motors, solenoids, other actuators, linkages, drive-belts, and the like coupled and operable to cause the arm(s) 104 and/or end effector(s) 108 to move within a range of motions. The manipulation subsystem may include a manipulator, a mechanism extending from the robot comprising one or more joints and one or more links arranged in a kinematic chain. The manipulation subsystem may include an end effector disposed on a distal report of the manipulator. The end effector may perform work on an item or work piece. Examples of end effectors include gripper or actuator but also includes specialized wrenches, spray nozzles, probes, and the like. The manipulation subsystem is communicatively coupled to the processor(s) via the bus(es).

A person of ordinary skill in the art will appreciate the components in the robotic manipulator 100 may be varied, combined, split, omitted, or the like. In some embodiments one or more of the network interface subsystem, input subsystem, output subsystem, propulsion or motion subsystem and/or manipulation subsystem are combined. In some embodiments, the output subsystem includes propulsion or motion subsystem and/or manipulation subsystem. In some embodiments, the input subsystem includes the network interface subsystem. In some embodiments, one or more of the subsystems (e.g., input subsystem) are split into further subsystems. In some embodiments, bus(es) is a plurality of buses (e.g., data buses, instruction buses, power buses) included in at least one body. For example, as part of a modular computing architecture where computational resources are distributed over the components of robotic manipulator 100. That is, a robot, like robotic manipulator 100, could in some embodiments, have a processor in one of the links 104a, 104b, 104c and a storage device in one of the other links 104a, 104b, 104c or the base 102. In some embodiments, computational resources are located in the interstitial spaces between structural or mechanical components of the robotic manipulator 100. A data storage device could be in different links 104a, 104b, 104c or in the base 102. In some implementations, the computational resources distributed over the body include redundant computational resources.

The at least one processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor may be referred to in the singular, but may be two or more processors.

The at least one storage device is at least one non-transitory or tangible storage device. In some implementations, the storage device(s) includes two or more distinct devices. The storage device(s) can, for example, include one or more volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device includes or stores processor-executable instructions and/or processor-readable data associated with the operation of the robotic manipulator 100. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor, or control subsystem, to carry out various methods and actions, for example via the propulsion or input subsystem, and/or manipulation subsystem. The processor(s) can cause a robot, such as robotic manipulator 100, to carry out various methods and actions, e.g., identify and manipulate items. Processor-executable instructions or data can, for example, include a basic input/output system (BIOS), an operating system, drivers, communication instructions or data, input instructions or data, output instructions or data, motion instructions or data, and executive instructions or data.

Exemplary operating systems for the operating system include ANDROID™, LINUX®, and WINDOWS®. The drivers include processor-executable instructions or data that allow processor(s) to control circuitry of the robotic manipulator 100. The processor-executable communication instructions or data include processor-executable instructions or data to implement communications between the robotic manipulator 100 and an operator console or terminal, a computer, or the like. The processor-executable input instructions or data guide the robotic manipulator 100 in processing input from sensors in the input subsystem. Processor-executable output instructions or data guide the robotic manipulator 100 in interacting within the environment via components of manipulation subsystem or output subsystem. Processor-executable motion instructions or data guide robotic manipulator 100 in moving within its environment via components in propulsion or motion subsystem. For example, processor-executable motion instructions or data may perform motion planning, inverse kinematics, or other motion related tasks. Processor-executable motion instructions or data may implement, in part, various methods described herein. The processor-executable motion instructions or data may, when executed, generate processor-executable robot control instructions, which when executed, causes robotic manipulator 100 to perform one or more actions. For example, the processor-executable motion instructions or data may, when executed, cause the end-effector to close on an item.

The processor-executable executive instructions or data guide the robotic manipulator 100 in reasoning, problem solving, planning tasks, performing tasks, and the like. The processor-executable executive instructions or data, when executed, may guide the robotic manipulator 100 to determine an action in view of environment information, simulation information, and augmented reality information. The processor-executable executive instructions or data may implement, in part, various methods described herein.

The input subsystem comprises sensors or transducers that acquire data for the robot. The data includes sensor information. Sensor information includes environmental sensor information representative of environmental conditions external to robotic manipulator 100. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, scanners, load cells, microphones, or the like. Sensor information can, for example, include diagnostic sensor information that is useful in diagnosing a condition or state of the robotic manipulator 100 or environment in which robotic manipulator 100 operates. For example, such sensors may include contact sensors, force sensors, strain gages, vibration sensors, position sensors, attitude sensors, accelerometers, and the like.

The output subsystem comprises one or more output devices. The output subsystem allows robotic manipulator 100 to send signals into the robot's environment. Example output devices are speakers, displays, lights, and the like. Robotic manipulator 100 may communicate with an agent, such as, a person, and another robot.

In further embodiments, the computer system includes at least one body or housing, and a control subsystem that includes at least one non-transitory processor, at least one non-transitory computer- or processor-readable storage device, and at least one bus to which the at least one processor and the at least one non-transitory computer- or processor-readable storage device are communicatively coupled. The computer system further includes a network interface subsystem communicatively coupled to bus(es) and providing a bi-directional communicative coupler among the computer system and other systems (e.g., processor-based devices associated with observers, online storage providers) via a network or non-network communication channel.

The computer system includes an input subsystem. The input subsystem may include one or more user interface input devices, such as, a touch display, a keyboard, a mouse or other pointer device, a microphone, and a camera. In some embodiments, the input subsystem is coupled to the control subsystem via network interface subsystem. In some embodiments, the input subsystem includes one or more sensors such as environmental sensors.

The computer system further includes storage device(s), which include or store processor-executable instructions or data associated with the operation of the computer system or robotic manipulator 100. In various implementations, the storage device(s) includes or stores one or more of: processor-executable analyzer instructions or data, processor-executable server instructions or data, processor-executable partition instructions or data, and processor-executable train, validate, test instructions or data. The processor-executable analyzer instructions or data, processor-executable server instructions or data, processor-executable partition instructions or data, and processor-executable train, validate, test instructions or data may implement, in part, various methods described herein. Processor-executable analyzer instructions or data, when executed by the control subsystem, generates processor-executable robot control instructions, such as, autonomous robot control instructions.

Figure 2:
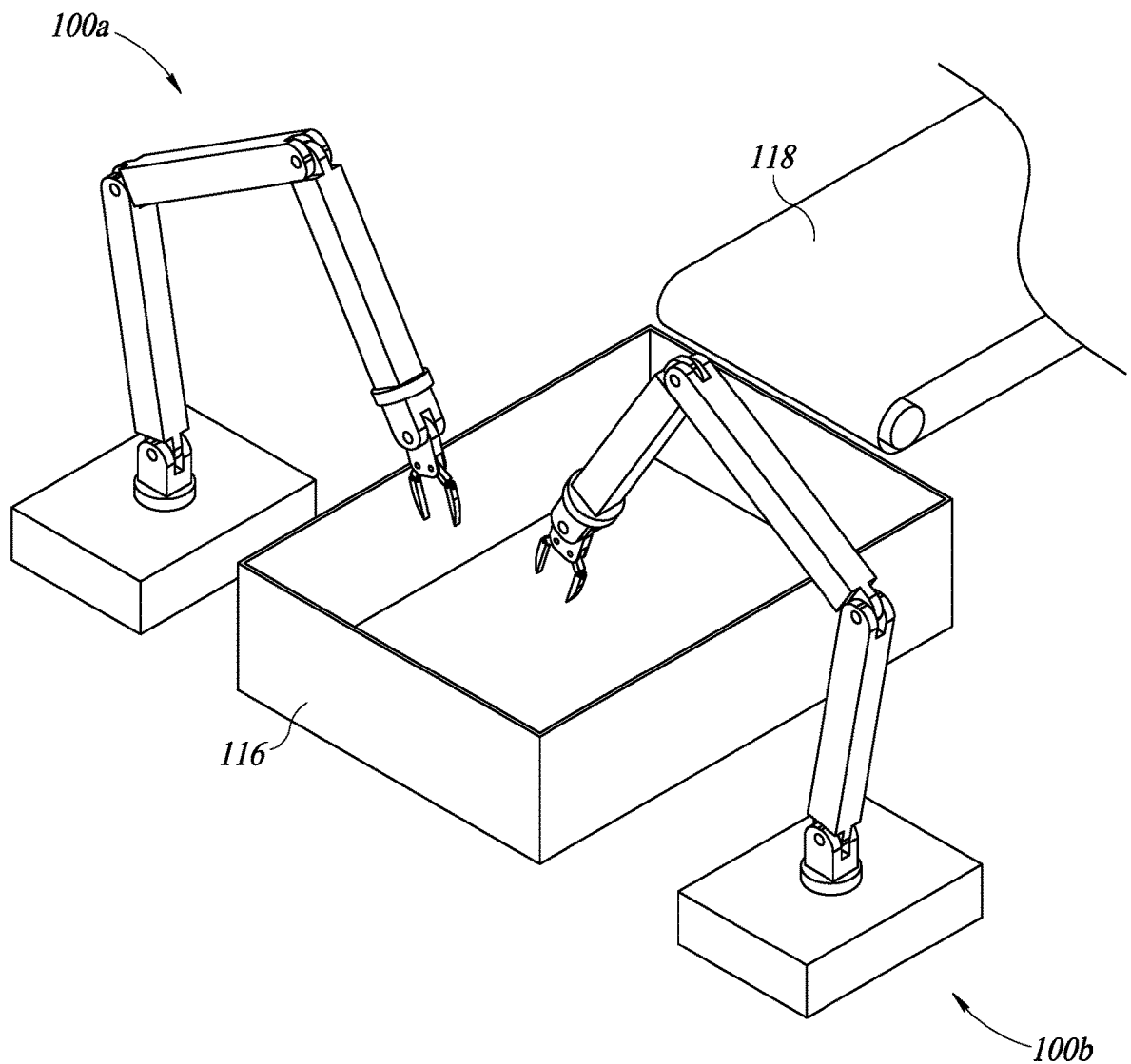
FIG. 2 is a schematic illustration of the robotic manipulator of FIG. 1 in a warehouse environment.

FIG. 2 illustrates an example environment 114 in which the robotic manipulator 100 may operate. The environment 114 includes two robotic manipulators 100a, 100b positioned on opposite sides of a container 116, which may contain a number of non-homogenous items, such as polybags filled with items of various shapes and sizes. The robotic manipulators 100a, 100b are identical to the robotic manipulator 100 described with reference to FIG. 1. The robotic manipulators 100a, 100b may be connected to a control system of the type described herein. The robotic manipulators 100a, 100b are configured to reach down into the container 116 and grasp the objects from the container 116 and place them on a conveyor belt 118 for further processing. The robotic manipulators 100a, 100b can simultaneously grasp the same object, which may be beneficial when the object to be grasped is particularly large or has an unusual shape.

For example, the first robotic manipulator 100a may try to grasp the object and if sensors on the first robotic manipulator 100a determine that the object is too heavy to be grasped by a single robotic manipulator 100a, the second robotic manipulator 100b may assist with grasping the object and lifting it to conveyor 118. In other embodiments, the first robotic manipulator 100a detects and grasps one side of the object and lifts it to be grasped by the second robotic manipulator 100b. The second robotic manipulator 100b then maintains its grasp on the one side of the object while the first robotic manipulator 100a repositions itself and grasps the other side of the object. The first and second robotic manipulators 100a, 100b then work together to move the object to the conveyor 118.

Figure 3:
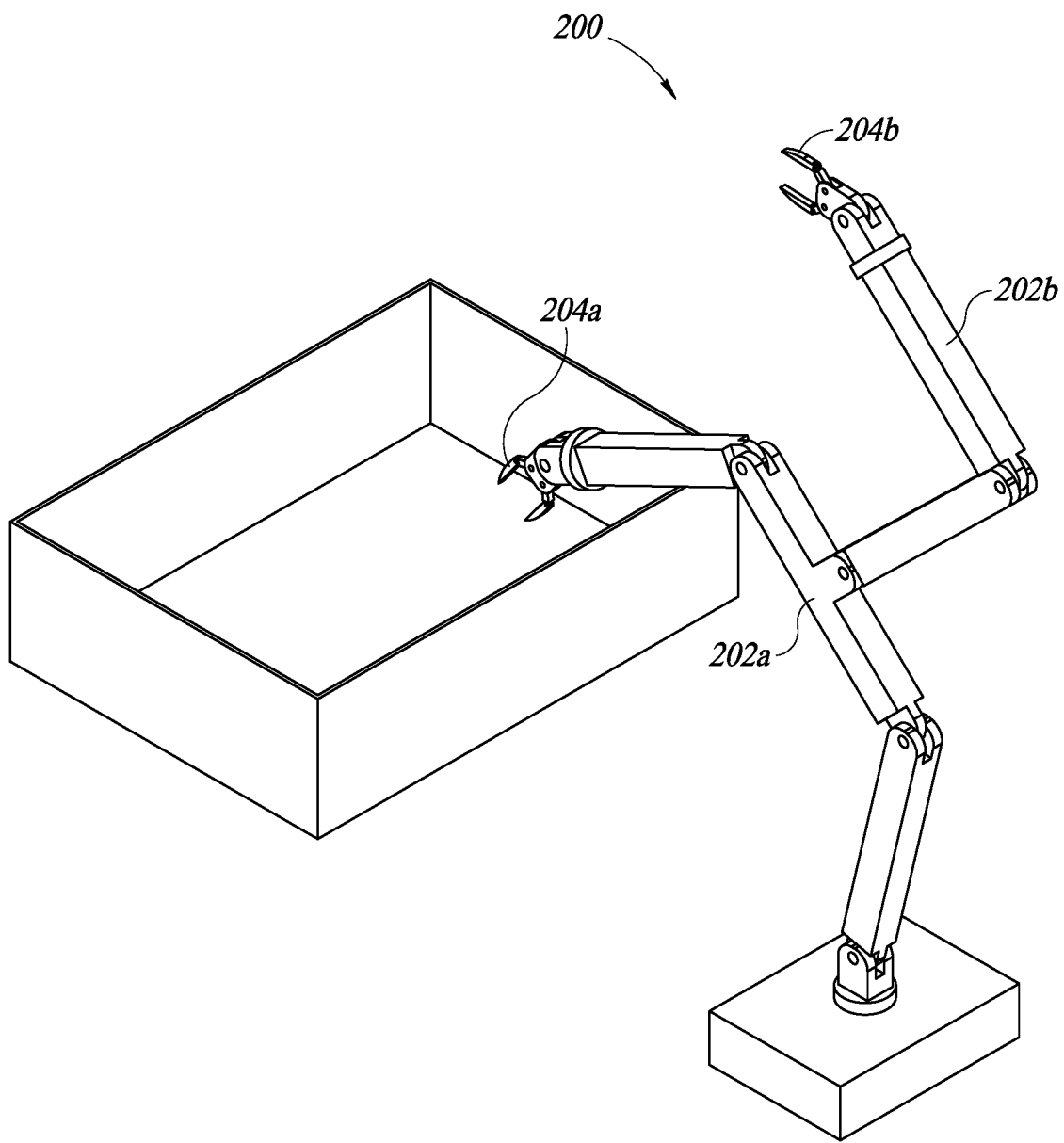
FIG. 3 is a perspective view of an embodiment of a robotic manipulator having two arms according to the present disclosure.

FIG. 3 illustrates an embodiment of a robotic manipulator 200 with two arms 202, each with an end effector 204. Specifically, the robotic manipulator 200 includes a first arm 202a and a second arm 202b wherein the first arm 202a includes an end effector 204a and the second arm 202b includes an end effector 204b. The second arm 202b is coupled to the first arm 202a. In some embodiments, the second arm 202b is structured to rotate relative to the first arm 202a such that the first and second arms 202a, 202b have the same number of degrees of freedom. However, in other embodiments, the second arm 202b has less degrees of freedom in its movement than the first arm 202a. For example, the first arm 202a may be identical to the robotic manipulator 100 in that it is not limited in movement in an x-y-z plane. The second arm 202b may be a fixed arm, or may be fixedly coupled to the first arm 202a, such that the second arm 202b can rotate toward or away from the first arm 202a, but cannot rotate relative to the first arm 202a at the coupling between the first arm 202a and the second arm 202b. As such, the first arm 202a and first end effector 204a can be used as a primary manipulator, with the second arm 202b and second end effector 204b providing supplemental securement as needed, similar to the arrangement described with reference to FIG. 2.

In one or more embodiments, the first arm 202a is the primary manipulator, such that the first arm 202a grasps and moves objects. When the object to be grasped is too heavy for the first arm 202a, or the first arm 202a cannot securely grasp the object, or the first arm 202a cannot position the object accurately, the second arm 202b can be used to provide supplemental securement by simultaneously grasping the object to assist the first arm 202a. The first arm 202a may then work in conjunction with the second arm 202b to move the object, or the first arm 202a may release its grasp on the object while the second arm 202b maintains its grasp, such that the first arm 202a can reposition itself and grasp the object at a second, different location to reposition the object.

Figure 4:
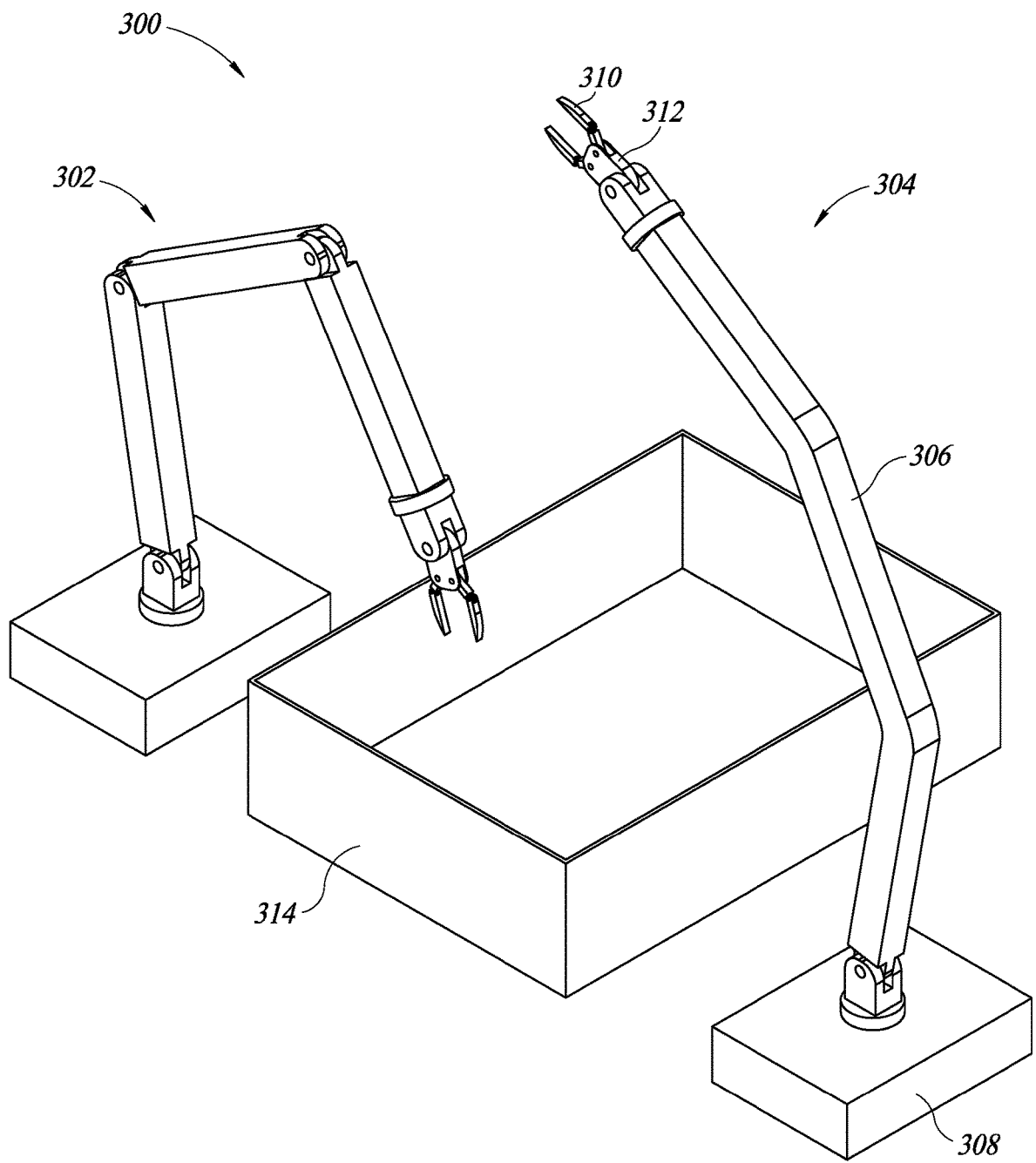
FIG. 4 is a schematic illustration of an embodiment of a first robotic manipulator and an embodiment of a second robotic manipulator in a warehouse environment according to the present disclosure.

FIG. 4 illustrates an embodiment of a system 300 including a first robotic manipulator 302 and a second robotic manipulator 304. The first robotic manipulator 302 is similar to the robotic manipulator 100 described herein. As such, repetitive description will be omitted. The second robotic manipulator 304 is a fixed or stationary robotic manipulator. As such, the second robotic manipulator 302 includes a body 306 fixedly coupled to a base 308. The second robotic manipulator 304 includes an end effector 310, which may similar to the other end effectors described herein. For example, the end effector 310 includes a connecting element 312 that is structured to rotate relative to the body 306 as well as fingers 310 coupled to the connecting element 312 and configured to open and close to grasp an object.

The first robotic manipulator 302 grasps an object from container 314 and moves it to a position proximate the second robotic manipulator 304, such that the end effector 310 of the second robotic manipulator 304 can grasp the object. The first robotic manipulator 302 then releases its grasp and repositions itself with respect to the object. As such, the first robotic manipulator 302 can use the second robotic manipulator 304 as a supplemental securement. For example, in an environment where an object from container 314 has a machine-readable symbol that is to be scanned before placing the object in a new location (e.g., a shipping box or a sorting compartment), locating the machine-readable symbol with a single robotic manipulator can be difficult. As such, the first robotic manipulator 302 can grasp the object and move it past a machine-readable symbol scanner.

If the scanner does not register a reading, the first robotic manipulator 302 can move the object to the second robotic manipulator 304, which can temporarily grasp the object while the first robotic manipulator 302 changes its position and orientation for an additional grasp of the object. For example, the second grasp by the first robotic manipulator 302 may be flip the object over. The first robotic manipulator 302 then moves the object past the line of sight of the machine-readable symbol scanner a second time, with the machine-readable symbol now visible to the scanner as a result of the object being flipped over.

In other embodiments, the first robotic manipulator 302 uses the second robotic manipulator 304 to assist with a sorting function. For example, the first robotic manipulator 302 may grasp an object with the intention of placing the object in a new location with a smaller shape or size than the first location (e.g., container 314). The second location may be a receptacle of a sorting station, for example. The first robotic manipulator 302 grasps the object and attempts to place it in the receptacle. If the first attempt is unsuccessful, the first robotic manipulator 302 recognizes that the object should be repositioned in order to fit inside the receptacle. As such, the first robotic manipulator 302 moves the object to the second robotic manipulator 304, which temporarily grasps the object. The first robotic manipulator 302 releases its grasp and repositions itself relative to the object before grasping the object a second time and repeating the sorting function.

Embodiments of the present disclosure are not limited to a shipping or warehousing environment where the robotic manipulators 302, 304 perform identification, sorting, and packing functions, among others. Rather, further embodiments include the robotic manipulators 302, 304 used in a manufacturing environment. For example, in some embodiments, one of the robotic manipulators 302, 304 includes an end effector and the other of the robotic manipulators 302, 304 including another type of device, such as a drill. As such, the first robotic manipulator grasps and positions the object based on trained grasping and positioning instructions from a computer system of the type described herein such that the second robotic manipulator 304 can drill a hole in the object as part of a manufacturing assembly line. In yet further embodiments, the robotic manipulators 302, 304 can be used in food processing, where the first robotic manipulator 302 includes an imaging device or scanner such that the first robotic manipulator 302 can scan a grasped object, such as an apple. Then, the second robotic manipulator 304 includes a knife or other processing equipment, such that if the scan by the first robotic manipulator 302 determines that a portion of the apple is bruised, the first robotic manipulator 302 moves the apple with the bruised section within reach of the second robotic manipulator 304 and the second robotic manipulator 304 removes the bruised section of the apple. As such, the robotic manipulators described herein can be trained for use in a number of different environments.

Figure 5B:
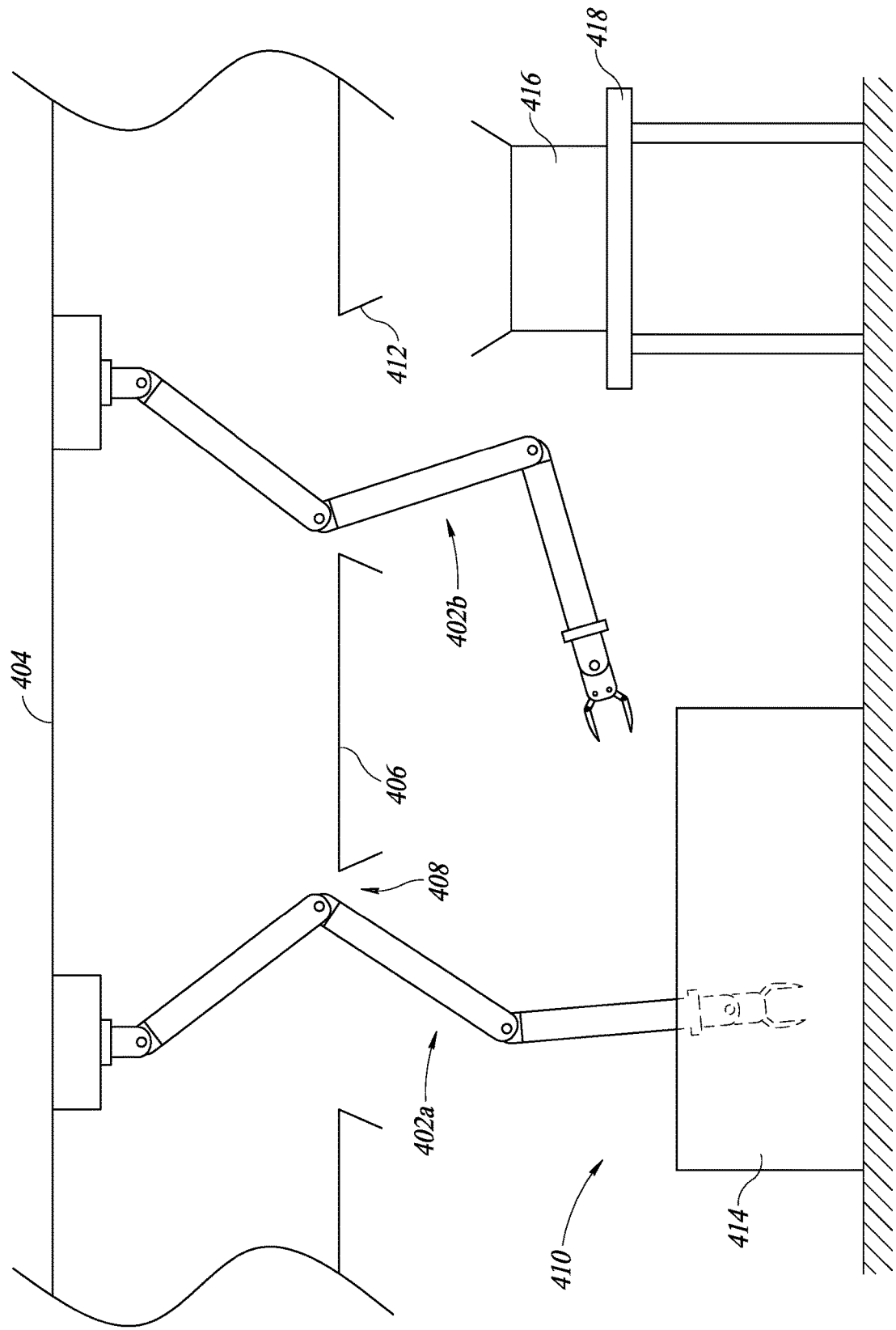
FIG. 5B is a side view of the robotic manipulator of FIG. 5A illustrating the robotic manipulator in a deployed configuration extending from the ceiling.

FIGS. 5A-5B illustrate a system 400 with robotic manipulators 402a, 402b coupled to a sub-ceiling 404. As such, the robotic manipulators 402a, 402b are recessed with respect to a ceiling 406 coupled to the sub-ceiling 404. In some embodiments, the robotic manipulators 402a, 402b are identical to the robotic manipulator 100, except that the robotic manipulators 402a, 402b are coupled to the ceiling 406 instead of the floor or some other support surface. The ceiling 406 further includes openings 408, such that when the robotic manipulators 402a, 402b are not in use, the robotic manipulators 402a, 402b can be stored without interfering with an environment 410.

Specifically, FIG. 5A illustrates the robotic manipulators 402a, 402b in a storage configuration. In the storage configuration, the robotic manipulators 402a, 402b are recessed with respect to the ceiling 406 (or wall or other structure). The ceiling 406 includes door 412 that can be closed when the robotic manipulators 402a, 402b are in the storage configuration. The robotic manipulators 402a, 402b can be folded such that they fit within the space between the ceiling 406 and the sub-ceiling, as shown in FIG. 5A. As such, the robotic manipulators 402a, 402b can be stored in a manner that does not interfere with an environment 410 when the robotic manipulators 402a, 402b are not in use.

FIG. 5B illustrates the robotic manipulators 402a, 402b in a deployed configuration. When the robotic manipulators 402a, 402b are selected to be operational by a user or by a pre-defined circumstance, such as an automatic turn-on time or initiation of a manufacturing or shipping system, the doors 412 open to expose openings 408 through the ceiling 406. The robotic manipulators 402a, 402b unfold and extend into the environment 410, such that the robotic manipulators 402a, 402b can interact with objects in the environment 410. For example, as shown in FIG. 5B, in the deployed configuration, the first robotic manipulator 402a extends into a container 414 to grasp an object. The first robotic manipulator 402a can then move the object to be grasped by the second robotic manipulator 402b, wherein the first robotic manipulator 402a releases its grasp when the object is securely held by the second robotic manipulator 402b. The second robotic manipulator 402b then moves the object and places it into a shipping container or box 416, which may be located on a table 418 or other like structure. In some embodiments, the shipping container 416 is replaced by a sorting station including a plurality of shelves or receptacles, and the second robotic manipulator 402b places the object into a certain one of the receptacles or on one of the shelves based on the characteristics of the object (e.g., weight or shape as determined by sensors on the robotic manipulators 402a, 402b).

Figure 6A:
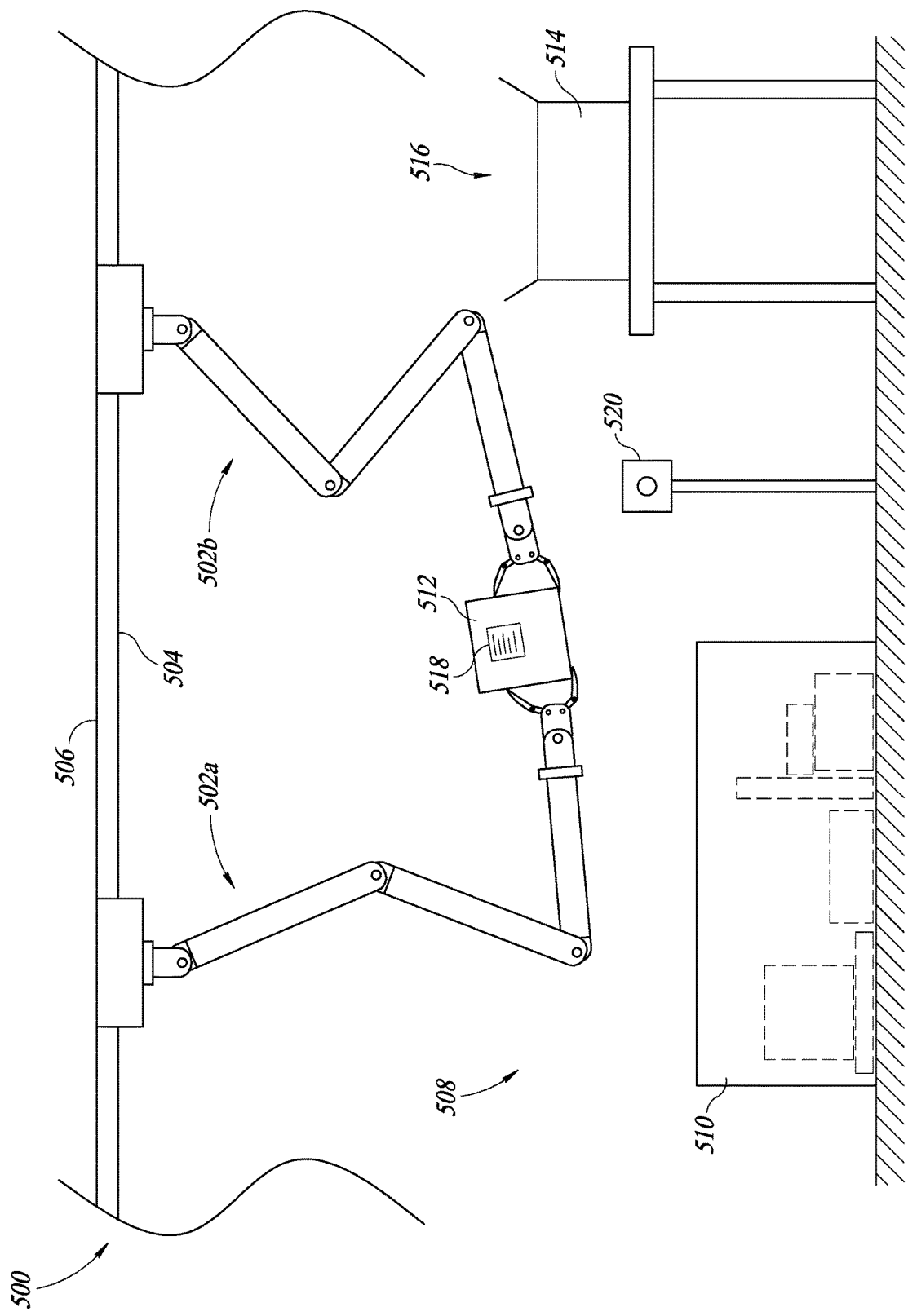
FIG. 6A is a schematic illustration of the robotic manipulator of FIG. 5B grasping an object.
Figure 6B:
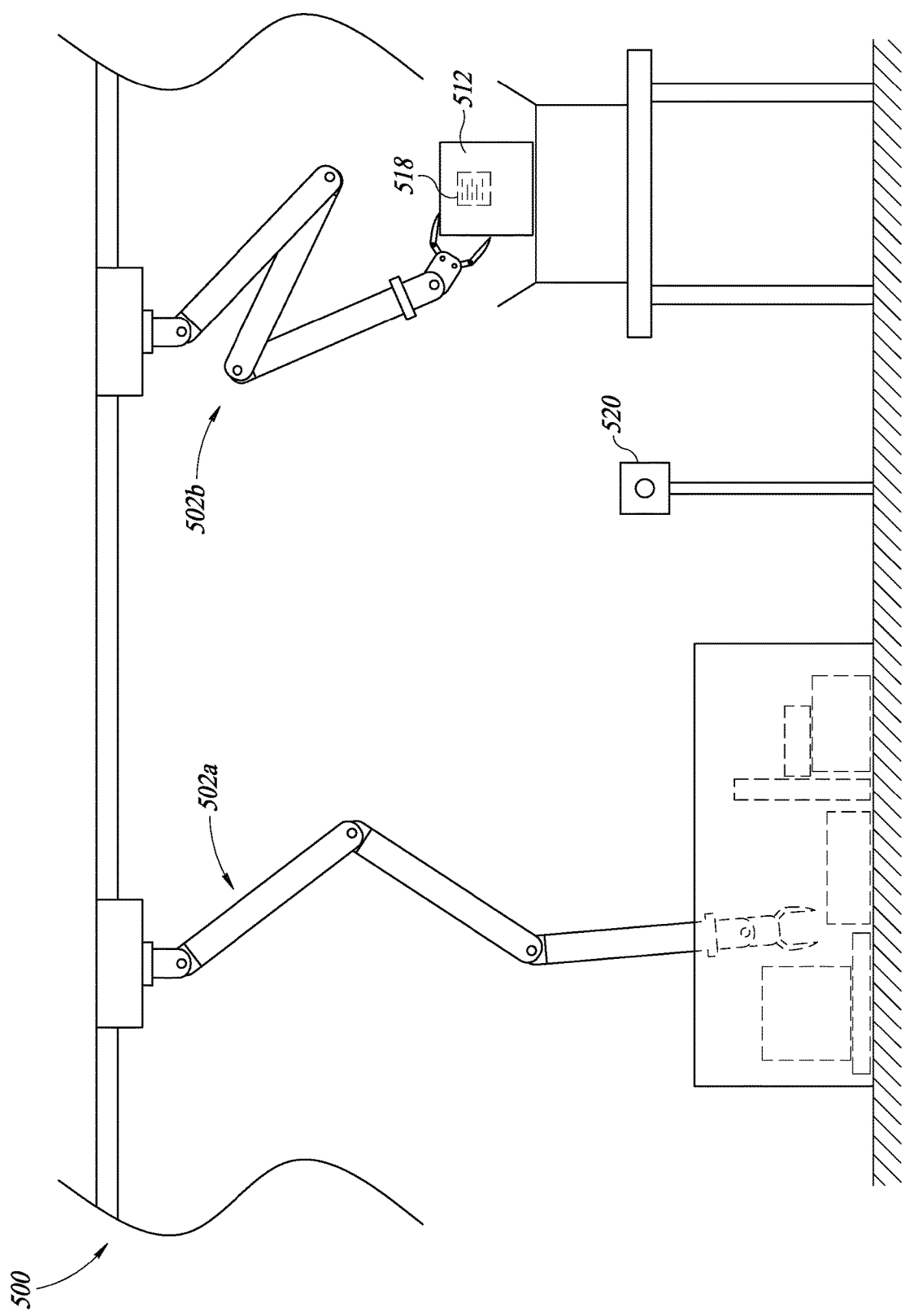
FIG. 6B is a schematic illustration of the robotic manipulator of FIG. 6A manipulating the object to a different orientation where a machine-readable symbol of the object is visible to a scanner.

FIGS. 6A-6B illustrate a further embodiment of a system 500 including robotic manipulators 502a, 502b, which may be identical to the robotic manipulator 100 except as otherwise provided herein. The robotic manipulators 502a, 502b are coupled to a rail or track 504 on a ceiling 506 of an environment 508. As such, the robotic manipulators 502a, 502b can slide along the track 504 to different positions selected by an operator. In some embodiments, the robotic manipulators 502a, 502b change positions along the track 504 autonomously. For example, the robotic manipulators 502a, 502b may receive a predefined set of instructions corresponding to movements before and after grasping an object. In some embodiments, the instructions may instruct the robotic manipulators 502a, 502b to slide along the track 504 to a first location corresponding to a container 510 in the environment. Then, the instructions instruct the robotic manipulators 502a, 502b to grasp an object 512 from the container 510. Once the object 512 is securely grasped, the instructions instruct the robotic manipulators 502a, 502b to move towards a box 514 or other receptacle for receiving the object 512. Finally, the instructions instruct the robotic manipulators 502a, 502b to align the object 512 with an opening 516 of the box and release the object 512 into the box 514 through the opening. In further embodiments, an operator manually positions the robotic manipulators 502a, 502b in the environment in a predefined location corresponding to a task for the robotic manipulators 502a, 502b. In yet further embodiments, the operator controls the position of the robotic manipulators 502a, 502b along the track 504 through a control interface system of the type described herein.

FIGS. 6A-6B further illustrate that the container 510 contains a number of objects with different shapes and sizes. As such, the robotic manipulators 502a, 502b can work together as described herein to grasp objects with various shapes and sizes, with the second robotic manipulator 502b providing supplemental securement to the first robotic manipulator 502a. Moreover, FIGS. 6A-6B illustrate how the robotic manipulators 502a, 502b work together in the environment 508 to accomplish a task, such as locating and scanning a machine-readable symbol 518 (e.g., barcode, QR code) of the object 512. Specifically, the first robotic manipulator 502 may pass the object 512 and machine-readable symbol 518 past a line of sight of a machine-readable symbol scanner 520. If the machine-readable symbol scanner does not register a signal corresponding to the machine-readable symbol, such as would be the case in FIG. 5A when the machine-readable symbol is located on the front of the object 512 and the scanner 520 is positioned to the back of the object 512, the robotic manipulators 502a, 502b work together to manipulate the object until the machine-readable symbol 518 passes through the line of sight of the scanner 520, as in FIG. 5B. In FIG. 5B, the machine-readable symbol 518 is shown in dashed lines to represent that it is now on the back of the object 512 by virtue of manipulation by the robotic manipulators 502a, 502b.

In further embodiments, one or both of the robotic manipulators 502a, 502b are trained with reinforcement learning techniques to recognize the location of the machine-readable symbol 518 on the object 512. For example, in some embodiments, the machine-readable symbol 518 is generally located in a similar area on each object 512 of a similar type. As such, over time, the robotic manipulators 502a, 502b can recognize that the machine-readable symbol 518 is most likely in a certain area based on their orientation during successful scans with the machine-readable symbol scanner 520. For example, the robotic manipulators 502a, 502b may detect, based on signals from the machine-readable symbol scanner 520 and the computer system associated with the system 500, that successful scans of the machine-readable symbol 518 are most likely to occur when the robotic manipulators 502a, 502b grasp the object 512 with major surfaces of the object 512 facing the line of sight of the scanner 520. As such, the robotic manipulators 502a, 502b will tend to grasp objects and attempt to pass them through the line of sight of the scanner 520 with one of the major surfaces of the object 512 facing the scanner 520 as opposed to smaller, side surfaces. In this way, the robotic manipulators 502a, 502b learn over time and adapt their behavior based on successful grasping and scanning tasks while deemphasizing unsuccessful tasks. Where the objects 512 have machine-readable symbols in different locations, the robotic manipulators 502a, 502b can first focus on securely grasping the objects of different sizes and shapes, with reinforcement learning providing guidance for future grasps and scans of similar sized objects.

Figure 7:
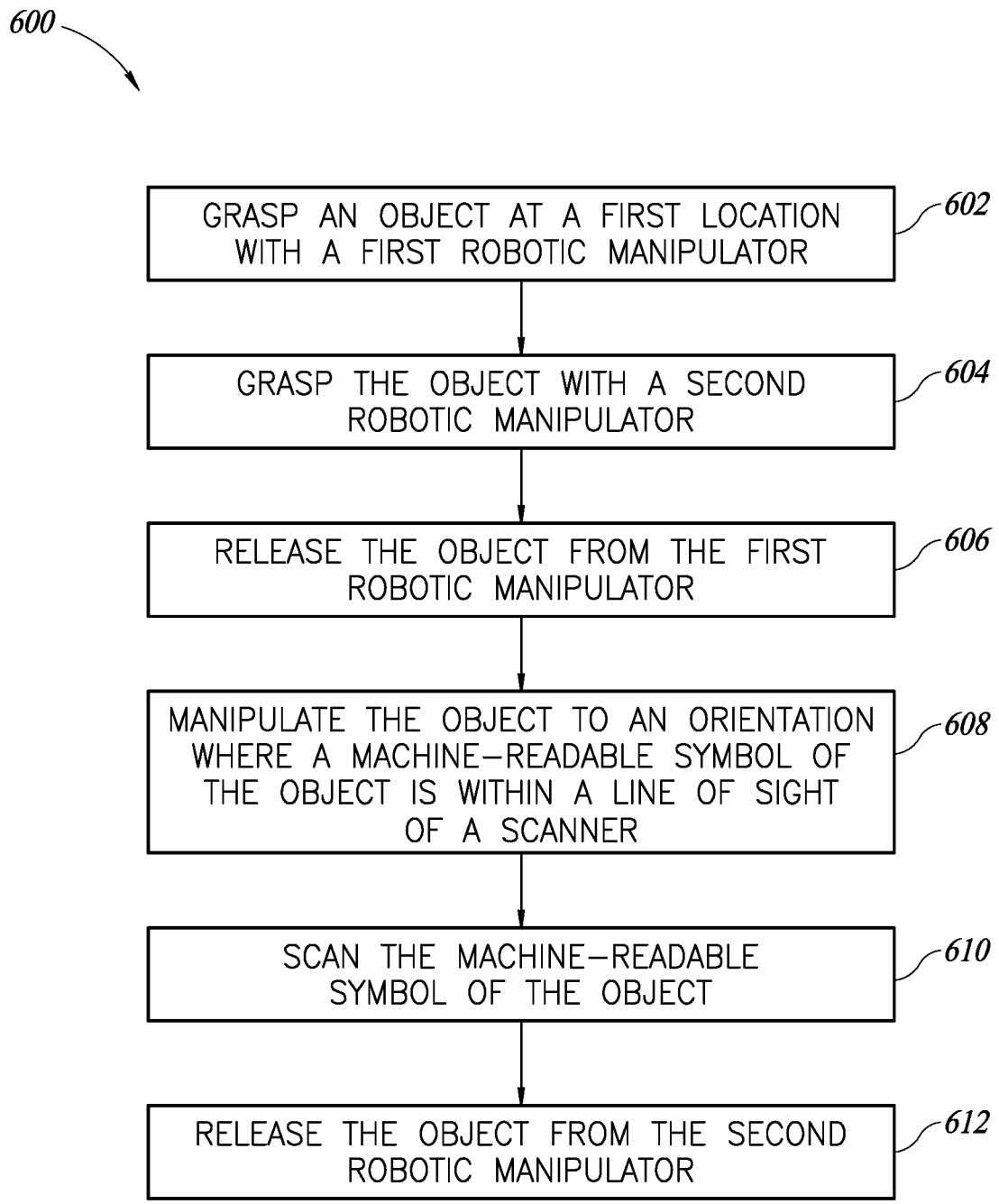
FIG. 7 is a flow chart illustrating an embodiment of a method of operation for a robotic manipulator according to the present disclosure.

FIG. 7 illustrates an embodiment of a method of operation 600 for the robotic manipulators described herein. The method 600 begins at 602 with a first robotic manipulator with a first end effector grasping an object with the first end effector at a first location, such as a storage container containing multiple objects. Then, a second robotic manipulator grasps the object with a second end effector at 604. The first robotic manipulator releases the object from the first end effector at 606. The method 600 further includes manipulating the object to an orientation where a machine-readable symbol of the object is within a line of sight of a scanner at 608. The manipulating can be performed by either the first or second robotic manipulators. For example, the second robotic manipulator can maintain its grasp while the first robotic releases its grasp and repositions itself for a secondary grasp. The second robotic manipulator can operate similarly with the first robotic manipulator holding its grasp while the second robotic manipulator repositions its grasp. In other embodiments, the first and second robotic manipulators manipulate the object while simultaneously grasping the object. The machine-readable symbol of the object is then scanned at 610 with a machine-readable symbol scanner of the type described herein. Then, the object is released from the second end effector of the robotic manipulator at 612 and the method 600 terminates. In some embodiments, releasing the object from the second end effector 612 includes releasing the object at a second location different from the first location, such as releasing the object onto a conveyor belt, into a shipping box, or into a receptacle of a sorting station.

In some embodiments, the method 600 further includes controlling a robot including the first robotic manipulator and the second robotic manipulator with a control system. In other words, the first and second robotic manipulators can be part of the same larger robot system, as described herein. In one non-limiting example, the first and second robotic manipulators are first and second arms of a single robot as described with reference to FIG. 3. The control system can include some or all of the features of the control systems described herein.

In yet further embodiments, the method 600 includes, before grasping the object at the first location, deploying the first robotic manipulator and the second robotic manipulator from a storage position wherein the first and second robotic manipulators are recessed with respect to a ceiling to a deployed configuration wherein the first and second robotic manipulators extend from the ceiling, as described herein with reference to FIGS. 5A-5B. In other embodiments, the first robotic manipulator has more degrees of freedom in its movement than the second robotic manipulator, which reduces complexity of the system and the automation or control instructions.

Figure 8:
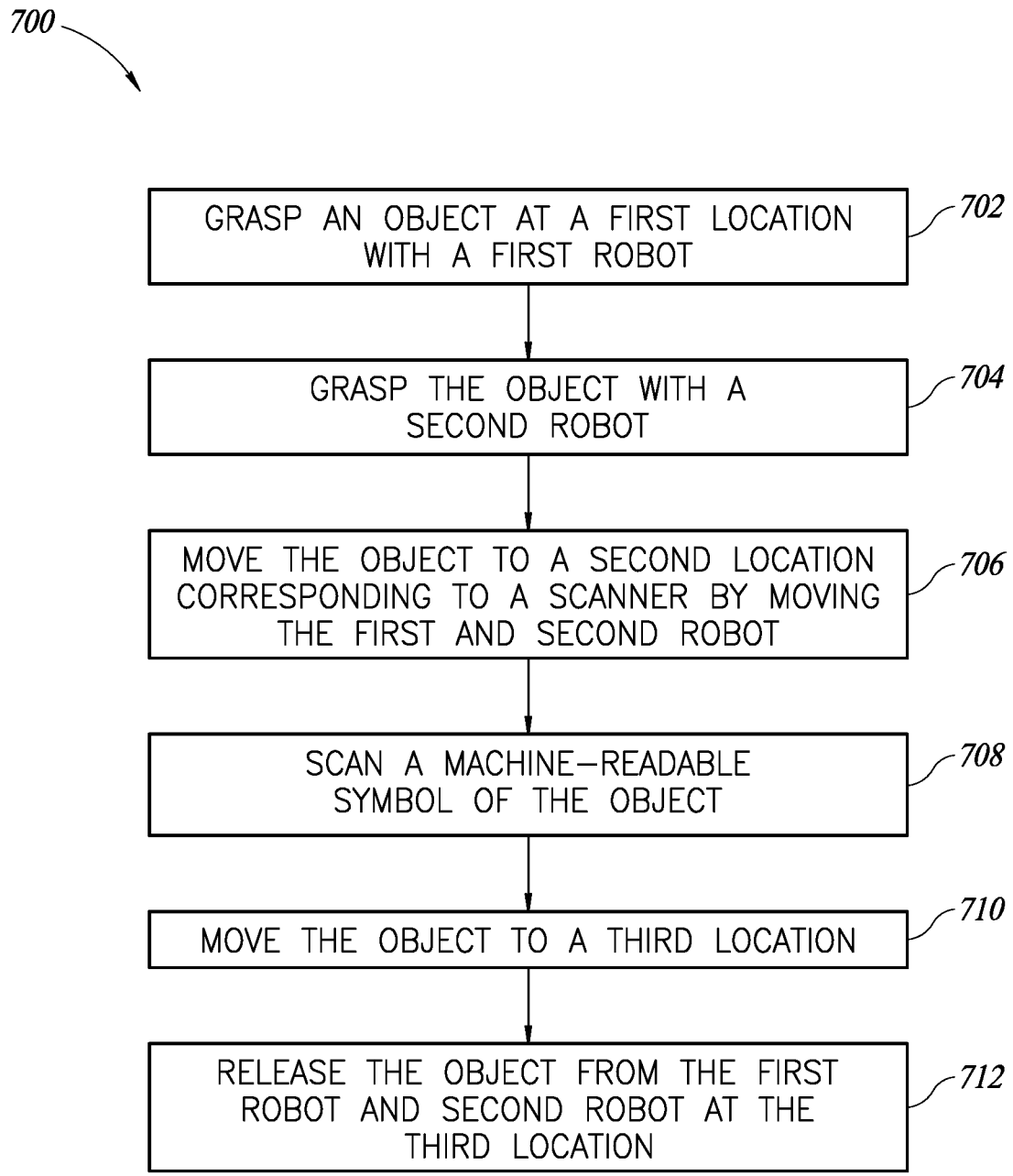
FIG. 8 is a flow chart illustrating an embodiment of a method of operation for a robotic manipulator according to the present disclosure.

FIG. 8 illustrates another embodiment of a method 700 of operation for the robotic manipulators described herein. The method 700 begins at 702 by grasping an object at a first location with a first robot, such as with an end effector or tool of the first robot. Then, at 704, the method 700 continues by grasping the object with a second robot. Grasping the object with the second robot similarly includes grasping the object with a tool or end effector of the second robot. The method 700 includes moving the object to a second location corresponding to a scanner by moving the first and second robots at 706. The step 706 can include manipulating the object, such as turning the object or rotating the object, such that a machine-readable symbol of the object is in a light of sight a scanner, which may be attached to and in communication with one of the robots, or may be a standalone and independent structure communicatively coupled to the first and second robots. Moving the first and second robots can include moving the first and second robots along a track in an environment, by wheels and a drivetrain of the robots, or by simply moving arms of the robots in order to create movement of the object. After the object is moved to the second location, the machine-readable symbol of the object is scanned at 708. Finally, the object is moved to a third location at 710 before being released from the first and second robot at the third location at 712.

In some embodiments, grasping the object with the second tool of the second robot includes grasping the object with the second tool of the second robot at the first location, such as when the object is determined by the first robot to be too heavy to carry with a single robot. In some embodiments, moving the object to the third location includes the third location being the same as the first location. In other words, the first and second robots can pick up and scan an object and return it to its original location, such as when the robots are tasked with performing an inventory task.

In other embodiments, releasing the object from the first and second tools at the third location includes releasing the object into a shipping container in a warehouse or shipping assembly line environment. As such, the first and second robots work together as described herein to align the object with the shipping container. Put another way, the object can be grasped from a first location, which may be a larger container or pallet of goods and placed in a much smaller location at the end of the method 700, such as in a shipping box for an individual product to be shipped to a consumer. Before the object is released from the first and second tools of the first and second robots, the method 700 can include manipulating the object to align the object with an opening of the shipping container, as described with reference to FIG. 6B.

Figure 9:
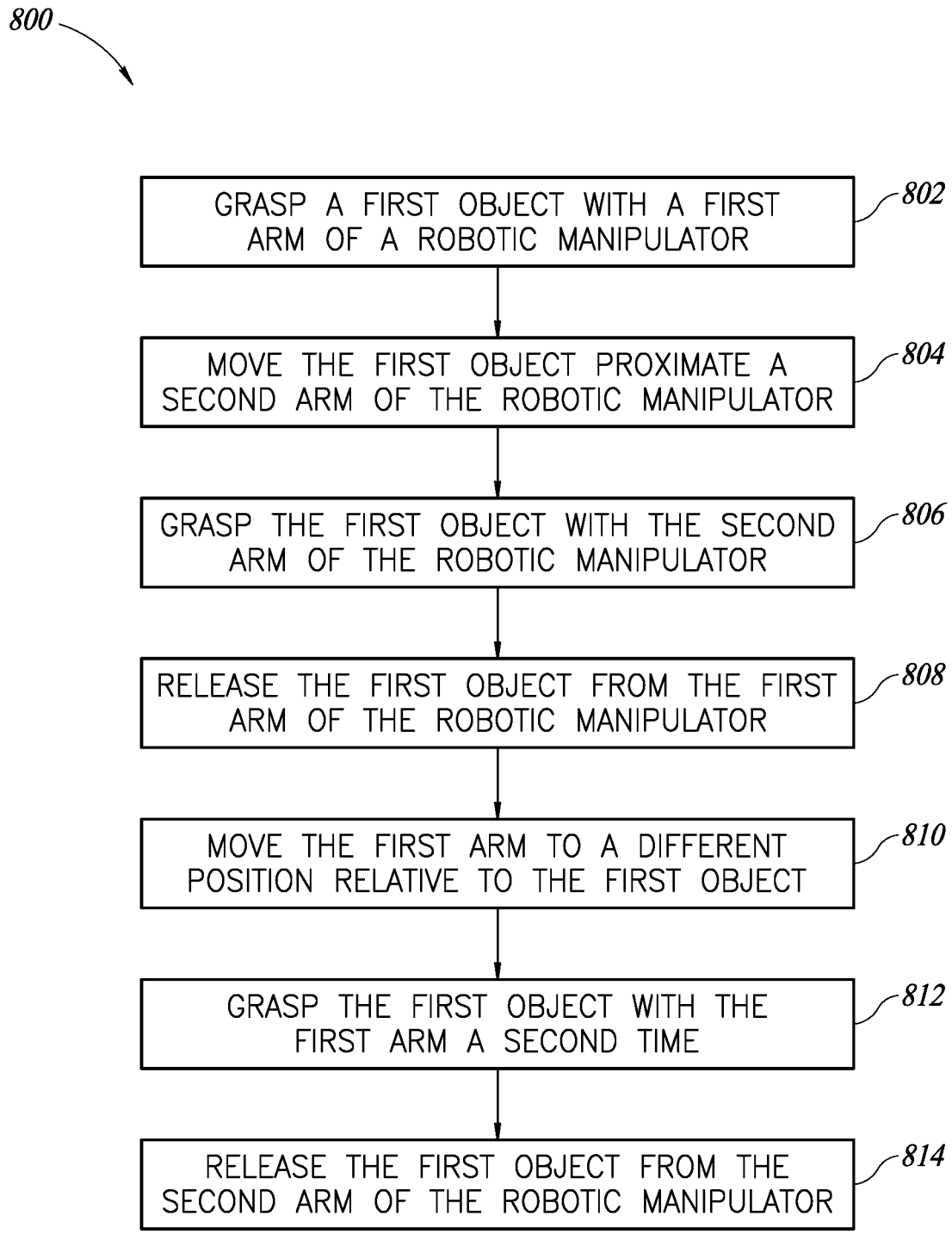
FIG. 9 is a flow chart illustrating an embodiment of a method of operation for a robotic manipulator according to the present disclosure.

FIG. 9 is a flow chart of an embodiment of a method 800. The method 800 begins at 802 with a first arm of a first robotic manipulator grasping a first object. The method continues at 804 by moving the first object proximate a second arm of the robotic manipulator and grasping the first object with the second arm of the robotic manipulator at 806. Then, the first object is released from the grip of the first arm at 808. The first arm then moves to a different position, location, or orientation relative to the first object at 810 before grasping the first object a second time at 812. Finally, the first object is released from the second arm of the robotic manipulator at 814, such that the object is grasped by the first robotic manipulator in a different orientation than the beginning of the method.

In some embodiments, grasping the first object with the second end effector of the second arm of the robotic manipulator includes the second arm of the robotic manipulator being stationary or otherwise having less degrees of freedom than the first robotic manipulator in order to decrease complexity and cost in the system.

In further embodiments, the method further includes after releasing the first object from the second end effector of the second arm of the robotic manipulator, grasping a second object with a different size and shape than the first object with the first end effector of the first arm of the robotic manipulator and moving the second object proximate the second arm of the robotic manipulator. As such, the first and second robotic manipulators can be used with objects having different shapes and sizes or with objects having similar overall sizes, but incongruent shapes, such as clothing or other items in polybags of a similar size, but potentially different shapes. In yet further embodiments, the method includes grasping the second object with the second arm of the robotic manipulator, moving the second object with the first arm of the robotic manipulator until a machine-readable symbol of the second object is in a line of sight of the scanner, and scanning the machine-readable symbol of the second object.

In the above description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end effectors and/or robotics, such as processors, sensors, storage devices, network interfaces, work pieces, tensile members, fasteners, electrical connectors, and the like are not shown or described in detail to avoid unnecessarily obscuring descriptions of the disclosed embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an action" includes an action, or two or more actions. It should also be noted that the term "or" is generally employed in its sense including "and/or" unless the content clearly dictates otherwise.

The headings provided herein are for convenience only and do not interpret the scope or meaning of the embodiments.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor-based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
grasping an object at a first location with a first end effector of a first robotic manipulator;
grasping the object with a second end effector of a second robotic manipulator while the object is grasped by the first end effector of the first robotic manipulator;
releasing the object from the first end effector of the first robotic manipulator while the object is grasped by the second end effector of the second robotic manipulator;
manipulating the object to an orientation where a machine-readable symbol of the object is within a line of sight of a scanner with the second end effector of the second robotic manipulator;
scanning the machine-readable symbol of the object with the scanner; and
releasing the object from the second end effector of the second robotic manipulator.

2. The method of claim 1, further comprising:
controlling a robot including the first robotic manipulator and the second robotic manipulator with a control system.

3. The method of claim 1, further comprising, before grasping the object at the first location:
deploying the first robotic manipulator and the second robotic manipulator from a storage position wherein at least one of the first and second robotic manipulators are recessed with respect to a ceiling or wall to a deployed configuration wherein the at least one of the first and second robotic manipulators extend from the ceiling or wall.

4. The method of claim 1, wherein manipulating the object includes manipulating the object with the second end effector of the second robotic manipulator.

5. The method of claim 1, wherein manipulating the object includes manipulating the object with the first end effector of the first robotic manipulator by grasping the object with the first end effector of the first robotic manipulator a second time after releasing the object from the first end effector of the first robotic manipulator, and releasing the object from the second end effector of the second robotic manipulator.

6. The method of claim 1, wherein grasping the object at the first location with the first end effector of the first robotic manipulator includes grasping the object at the first location with the first end effector of the first robotic manipulator which has a first number of degrees of freedom and grasping the object with the second end effector of the second robotic manipulator includes grasping the object with the second end effector of the second robotic manipulator which has a second number of degrees of freedom less than the first number of degrees of freedom.

7. The method of claim 1, wherein releasing the object from the second end effector of the second robotic manipulator includes releasing the object at a second location different from the first location.

8. A method, comprising:
grasping an object at a first location with a first tool of a first robot;
simultaneously grasping the object with a second tool of a second robot;
moving the object to a second location proximate to a scanner by moving the first robot and the second robot;
scanning a machine-readable symbol of the object using the scanner;
moving the object to a third location; and
releasing the object from the first tool of the first robot and the second tool of the second robot at the third location.

9. The method of claim 8, wherein moving the object with the first tool and the second tool includes manipulating the object to an orientation wherein the machine-readable symbol of the object is within a line of sight of the scanner.

10. The method of claim 8, wherein grasping the object with the second tool of the second robot includes grasping the object with the second tool of the second robot at the first location.

11. The method of claim 8, wherein moving the object to the third location includes moving the object to the third location which is the same location as the first location.

12. The method of claim 8, wherein releasing the object from the first tool and the second tool includes releasing the object into a shipping container.

13. The method of claim 12, further comprising, before releasing the object from the first tool and the second tool:
manipulating the object to align the object with an opening of the shipping container.

14. The method of claim 8, wherein moving the object with the first tool and the second tool includes manipulating the object to an orientation where the machine-readable symbol of the object is in a line of sight of the scanner.

15. A method, comprising:
grasping a first object with a first end effector of a first arm of a robotic manipulator;
moving the first object proximate a second arm of the robotic manipulator with the first end effector of the first arm of the robotic manipulator;
grasping the first object with a second end effector of the second arm of the robotic manipulator while the object is grasped by the first end effector of the first arm of the robotic manipulator;
releasing the first object from the first end effector of the first arm of the robotic manipulator;
moving the first end effector of the first arm to a different position relative to the first object;
grasping the first object with the first end effector of the first arm a second time; and
releasing the first object from the second end effector of the second arm of the robotic manipulator.

16. The method of claim 15 wherein grasping the first object with the second end effector of the second arm of the robotic manipulator includes the second arm of the robotic manipulator being stationary.

17. The method of claim 15 further comprising, after releasing the first object from the second end effector of the second arm of the robotic manipulator:
grasping a second object with a different size and shape than the first object with the first end effector of the first arm of the robotic manipulator; and
moving the second object proximate the second arm of the robotic manipulator.

18. The method of claim 17 further comprising:
grasping the second object with the second arm of the robotic manipulator;
moving the second object with the first arm of the robotic manipulator until a machine-readable symbol of the second object is in a line of sight of a scanner; and
scanning the machine-readable symbol of the second object using the scanner.

* * * * *